United States Patent
Dede et al.

(10) Patent No.: US 9,511,549 B2
(45) Date of Patent: Dec. 6, 2016

(54) ANISOTROPIC THERMAL ENERGY GUIDING SHELLS AND METHODS FOR FABRICATING THERMAL ENERGY GUIDING SHELLS

(71) Applicant: Toyota Motor Engineering & Manufacturing North America, Inc., Erlanger, KY (US)

(72) Inventors: Ercan Mehmet Dede, Ann Arbor, MI (US); Tsuyoshi Nomura, Ann Arbor, MI (US); Paul Schmalenberg, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 192 days.

(21) Appl. No.: 14/293,224

(22) Filed: Jun. 2, 2014

(65) Prior Publication Data

US 2015/0351279 A1    Dec. 3, 2015

(51) Int. Cl.
| | |
|---|---|
| *B29C 70/42* | (2006.01) |
| *B29C 70/46* | (2006.01) |
| *B29C 70/88* | (2006.01) |
| *F28F 9/00* | (2006.01) |
| *F28F 13/14* | (2006.01) |

(Continued)

(52) U.S. Cl.
CPC .............. *B29C 70/46* (2013.01); *B29C 70/42* (2013.01); *B29C 70/885* (2013.01); *F28F 9/001* (2013.01); *F28F 13/14* (2013.01); *F28F 21/00* (2013.01);

(Continued)

(58) Field of Classification Search
CPC ..... B29C 70/46; B29C 70/42; B29C 70/885; F28F 21/00; F28F 13/14; B29K 2995/0013; B29K 2105/089; H05K 7/2039; H05K 7/20409; H05K 7/20418; H05K 7/20436; H05K 7/20445

USPC ........ 361/679.46–679.54, 688–723; 165/185

See application file for complete search history.

(56) References Cited

U.S. PATENT DOCUMENTS

| | | | | |
|---|---|---|---|---|
| 4,312,913 A * | 1/1982 | Rheaume | ............... | D03D 11/00 139/408 |
| 6,278,049 B1 | 8/2001 | Johnson et al. | | |

(Continued)

OTHER PUBLICATIONS

Brust, Gregory; SCRIMP: Cost Effective Materials Combined More Effectively; 2005; Polymer Science Learning Center, Dept. of Polymer Science, University of Southern Mississippi.

(Continued)

*Primary Examiner* — Anthony Haughton
*Assistant Examiner* — Yahya Ahmad
(74) *Attorney, Agent, or Firm* — Dinsmore & Shohl LLP (57) ABSTRACT

Anisotropic thermal energy guiding shells and methods for fabricating thermal energy guiding shells are provided. An anisotropic thermal energy guiding shell includes an interior volume defined within the anisotropic thermal energy guiding shell, a plurality of thermally conductive fibers, and at least one component attachment region. The plurality of thermally conductive fibers are arranged to guide thermal energy received by the anisotropic thermal energy guiding shell non-uniformly relative to the at least one component attachment region according to a thermal energy management objective. A method for fabricating a thermal energy guiding shell includes forming a composite fabric of thermally conductive fibers, impregnating the composite fabric of thermally conductive fibers with a resin, curing the impregnated composite fabric of thermally conductive fibers, and forming the impregnated composite fabric of thermally conductive fibers into the thermal energy guiding shell.

18 Claims, 8 Drawing Sheets

(51) Int. Cl.
*F28F 21/00* (2006.01)
*B29K 105/08* (2006.01)

(52) U.S. Cl.
CPC .. *B29K 2105/089* (2013.01); *B29K 2995/0013* (2013.01)

(56) References Cited

U.S. PATENT DOCUMENTS

| | | | |
|---|---|---|---|
| 7,037,797 | B1 | 5/2006 | Shooshtarian et al. |
| 7,362,042 | B2 | 4/2008 | Bae et al. |
| 7,868,083 | B2 | 1/2011 | Ristic-Lehmann et al. |
| 8,008,091 | B2 | 8/2011 | Higashino et al. |
| 8,516,831 | B2 | 8/2013 | Dede |
| 2007/0109753 | A1* | 5/2007 | Bae ............ H05K 7/20963 361/724 |
| 2012/0000639 | A1* | 1/2012 | Dede ............ F28F 13/00 165/200 |
| 2013/0014916 | A1 | 1/2013 | Wadley et al. |
| 2014/0284039 | A1* | 9/2014 | Dede ............ F28F 13/14 165/185 |
| 2014/0318829 | A1* | 10/2014 | Dede ............ H05K 1/0203 174/251 |
| 2015/0169015 | A1* | 6/2015 | Yebka ............ G06F 1/203 361/679.54 |

OTHER PUBLICATIONS

Federal Aviation Administration; Aviation Maintenance Technician Handbook, Chapter 7, "Advanced Composite Material."
Glass, David E.; Ceramic Matrix Composite (CMC) Thermal Protection Systems (TPS) and Hot Structures for Hypersonic Vehicles; Apr. 28, 2008; NASA Technical Reports Server.
Dede, Ercan M. et al.; Heat flux cloaking, focusing, and reversal in ultra-thin composites considering conduction-convection effects; Aug. 5, 2013; Applied Physics Letters 103, 063501 (2013).
Dede, Ercan M. et al.; Thermal-composite design optimization for heat flux shielding, focusing, and reversal; Jul. 4, 2013; Journal of the International Society for Structural and Multidisciplinary Optimization.
Narayana, Supradeep et al.; Heat Flux Manipulation with Engineered Thermal Materials; May 21, 2012; Physical Review Letters 108, 214303 (2012).
Dede, Ercan M.; Simulation and optimization of heat flow via anisotropic material thermal conductivity; Oct. 12, 2010; Computational Materials Science 50 (2010) 510-515.
U.S. Appl. No. 13/848,827, filed Mar. 22, 2013.
U.S. Appl. No. 14/038,834, filed Sep. 27, 2013.
U.S. Appl. No. 14/038,837, filed Sep. 27, 2013.

* cited by examiner

ANISOTROPIC THERMAL ENERGY GUIDING SHELLS AND METHODS FOR FABRICATING THERMAL ENERGY GUIDING SHELLS

TECHNICAL FIELD

The present specification generally relates to thermal energy guiding devices and, more specifically, to anisotropic thermal energy guiding shells and methods for fabricating thermal energy guiding shells.

BACKGROUND

A number of devices emit thermal energy in various quantities and forms. For example, electronic components, internal combustion engines, motors, electromechanical systems, and the like may emit thermal energy that is dissipated to the environment. Temperature sensitive components may be enclosed within or attached to an enclosure or shell that is subject to such emitted thermal energy. It may be desirable to manage such emitted thermal energy, such as by guiding the emitted thermal energy received by enclosures or shells that include temperature sensitive components.

Accordingly, a need exists for anisotropic thermal energy guiding shells and methods for fabricating thermal energy guiding shells.

SUMMARY

In one embodiment, an anisotropic thermal energy guiding shell includes an interior volume defined within the anisotropic thermal energy guiding shell, a plurality of thermally conductive fibers, and at least one component attachment region. The plurality of thermally conductive fibers are arranged to guide thermal energy received by the anisotropic thermal energy guiding shell non-uniformly relative to the at least one component attachment region according to a thermal energy management objective.

In another embodiment, a method for fabricating a thermal energy guiding shell includes forming a composite fabric of thermally conductive fibers, impregnating the composite fabric of thermally conductive fibers with a resin, curing the impregnated composite fabric of thermally conductive fibers, and forming the impregnated composite fabric of thermally conductive fibers into the thermal energy guiding shell.

In yet another embodiment, a method for fabricating a thermal energy guiding shell includes forming a planar thermal energy guiding substrate to achieve a thermal energy management objective, and forming the thermal energy guiding shell from the planar thermal energy guiding substrate, wherein the thermal energy guiding shell defines an interior volume.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include anisotropic thermal energy guiding shells and methods for fabricating thermal energy guiding shells. Referring generally to the figures, anisotropic thermal energy guiding shells, as described herein, may include an interior volume defined within the shell, a plurality of thermally conductive fibers, and at least one component attachment region. The plurality of thermally conductive fibers may be arranged to guide thermal energy received by the shell non-uniformly relative to the component attachment region according to a thermal energy management objective, such as guiding thermal energy away from the component attachment region (e.g., when a temperature sensitive component is mechanically coupled to the component attachment region), or guiding thermal energy to the component attachment region (e.g., when a thermal energy capture device is mechanically coupled to the component attachment region). Embodiments of anisotropic thermal energy guiding shells described herein may be used to manage thermal energy received by complex three-dimensional surfaces of the shell to achieve a variety of thermal energy management objectives. Embodiments disclosed herein also include methods for fabricating thermal energy guiding shells that include forming a composite fabric of thermally conductive fibers, impregnating the composite fabric of thermally conductive fibers with a resin, curing the impregnated composite fabric, and forming the impregnated composite fabric into the thermal energy guiding shell. Such fabrication methods may allow for thermal energy guiding shells to be quickly and easily fabricated in order to achieve a number of potentially complicated thermal management objectives. The various anisotropic thermal energy guiding shells and methods for fabricating thermal energy guiding shells will be described in more detail herein with specific reference to the corresponding drawings.

Figure 1:
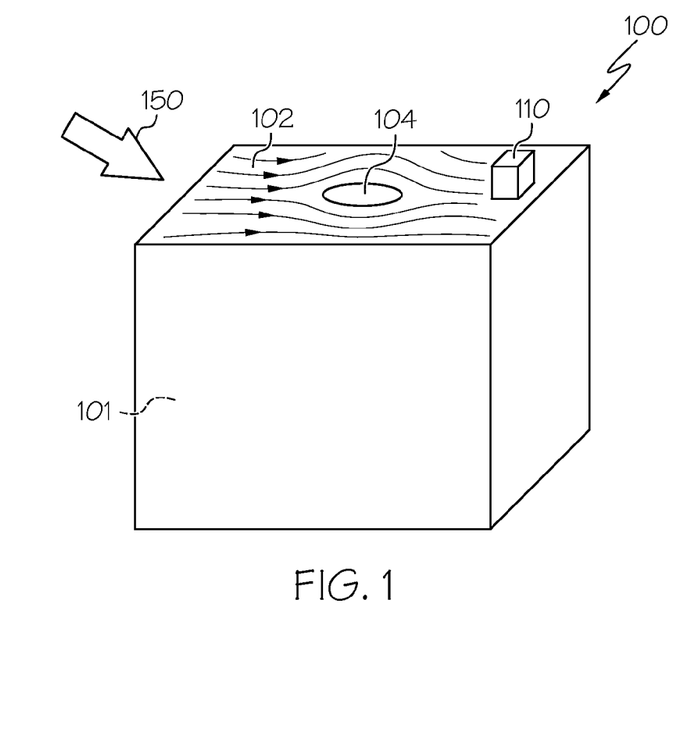
FIG. 1 schematically depicts an anisotropic thermal energy guiding shell, according to one or more embodiments shown and described herein.

Referring now to FIG. 1, an anisotropic thermal energy guiding shell 100 is schematically depicted. The anisotropic thermal energy guiding shell 100 includes an interior volume 101, a first side 102, a component attachment region 104, and a thermal energy capture device 110. The interior volume 101 is defined by a plurality of sides of the anisotropic thermal energy guiding shell 100. The anisotropic thermal energy guiding shell 100 depicted in FIG. 1 is box shaped. However, it should be understood that in other embodiments, the anisotropic thermal energy guiding shell 100 may be differently shaped, such as when the anisotropic thermal energy guiding shell 100 includes one or more curved surfaces or when the anisotropic thermal energy guiding shell 100 is a complex three-dimensional shape.

In some embodiments, the interior volume 101 may be completely enclosed by the sides of the interior volume 101. In other embodiments, the interior volume 101 may only be partially enclosed by the sides of the interior volume 101, such as in embodiments in which the anisotropic thermal energy guiding shell 100 has a partially open configuration.

The first side 102 of the anisotropic thermal energy guiding shell 100 includes the component attachment region 104. A component disposed within the interior volume 101 of the anisotropic thermal energy guiding shell 100 may be mechanically coupled to the component attachment region 104. For example, referring now to FIG. 2 (which depicts a thermal energy guiding assembly 200 including the anisotropic thermal energy guiding shell 100 of FIG. 1 and a printed circuit board 120), the printed circuit board 120 is disposed within the interior volume 101 of the anisotropic thermal energy guiding shell 100 and is mechanically coupled to the component attachment region 104. The printed circuit board 120 is mechanically coupled to the component attachment region 104 of the first side 102 by a first attachment bracket 122. The printed circuit board 120 is in thermal communication with the component attachment region 104 via the first attachment bracket 122. The printed circuit board 120 is a temperature sensitive component for which it may be desirable to guide thermal energy received by the anisotropic thermal energy guiding shell 100 away from the component attachment region 104 to minimize the thermal energy communicated to the printed circuit board 120 via the component attachment region 104. Details will be provided below as to how the anisotropic thermal energy guiding shell 100 guides thermal energy away from the component attachment region 104 to minimize the thermal energy communicated to the printed circuit board 120 via the component attachment region 104. While the embodiment depicted in FIG. 2 only illustrates only one component attachment region 104 on the first side 102, it should be understood that other embodiments may include more than one component attachment region 104, such as embodiments in which more than a single component disposed within the interior volume 101 is mechanically coupled to more than one component attachment region 104, or embodiments in which multiple components disposed within the interior volume 101 are mechanically coupled to one or more component attachment regions 104.

While the printed circuit board 120 is mechanically coupled to the component attachment region 104 by the first attachment bracket 122, in other embodiments, the printed circuit board 120 may be directly mechanically coupled to the component attachment region 104 or may be mechanically coupled to the component attachment region 104 by one or more components other than the first attachment bracket 122. While the component mechanically coupled to the component attachment region 104 depicted in FIG. 2 is the printed circuit board 120, it should be understood that in other embodiments, the component mechanically coupled to the component attachment region 104 may be a different temperature sensitive component.

Figure 2:
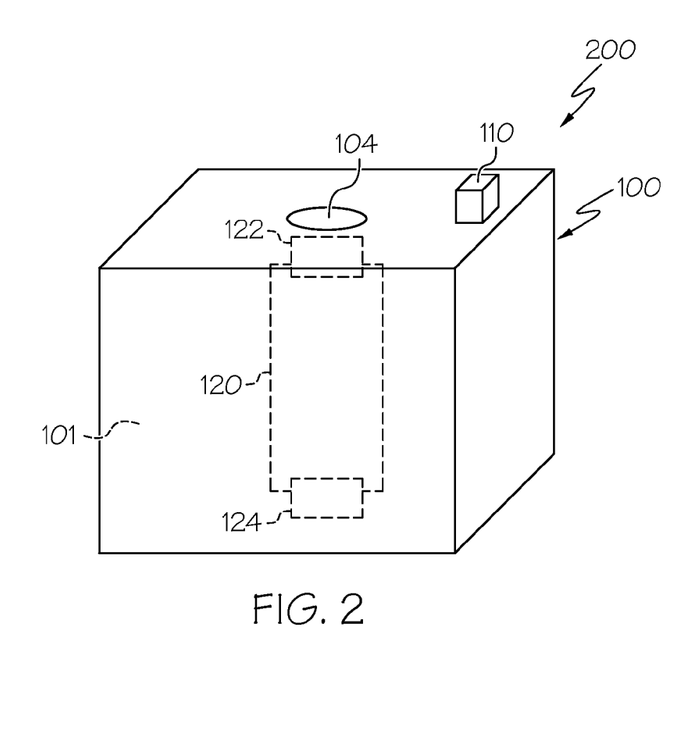
FIG. 2 schematically depicts a thermal energy guiding assembly including the anisotropic thermal energy guiding shell of FIG. 1 and a printed circuit board disposed in an interior volume of the shell, according to one or more embodiments shown and described herein.

Still referring to FIG. 2, the printed circuit board 120 is mechanically coupled to and in thermal communication with another component attachment region (not shown) on another side (not shown) of the anisotropic thermal energy guiding shell 100 by a second attachment bracket 124. As with the component attachment region 104, it may also be desirable to guide thermal energy received by the anisotropic thermal energy guiding shell 100 away from the additional component attachment region.

Referring once again to FIG. 1, the anisotropic thermal energy guiding shell 100 is configured to non-uniformly guide thermal energy 150 received by the anisotropic thermal energy guiding shell 100 relative to the component attachment region 104 according to a thermal energy management objective. The thermal energy 150 may originate from a radiating thermal energy source or may be transferred to the anisotropic thermal energy guiding shell 100 by convection or conduction. In some embodiments, the thermal energy 150 may be generated by electronic components, internal combustion engines, motors, electromechanical systems, friction of the anisotropic thermal energy guiding shell 100 traveling through the air, or the like. In the embodiment depicted in FIG. 1, the non-uniform guiding of the thermal energy 150 is depicted by the arrowed lines of the top side 102.

Still referring to FIG. 1, in some embodiments, such as in embodiments in which a temperature sensitive component is mechanically coupled to the component attachment region 104 and in thermal communication with the component attachment region 104, the thermal energy management objective may be to guide the thermal energy 150 received by the anisotropic thermal energy guiding shell 100 away from the component attachment region 104. In some embodiments, such as in embodiments in which a temperature sensitive component is mechanically coupled to the component attachment region 104 and in thermal communication with the component attachment region 104, the thermal energy management objective may be to minimize an amount of the thermal energy 150 received by the anisotropic thermal energy guiding shell 100 at the component attachment region 104. In some embodiments, such as in embodiments in which a thermal energy capture device is mechanically coupled to the component attachment region 104 and in thermal communication with the component attachment region 104, the thermal energy management objective may be to guide the thermal energy 150 received by the anisotropic thermal energy guiding shell 100 to the component attachment region 104 so that the thermal energy is received by the thermal energy capture device. In some embodiments, such as in embodiments in which a thermal energy capture device is mechanically coupled to the component attachment region 104 and in thermal communication with the component attachment region 104, the thermal energy management objective may be to maximize an amount of the thermal energy 150 received by the anisotropic thermal energy guiding shell 100 at the component attachment region 104 so that the thermal energy is received by the thermal energy capture device.

Still referring to FIG. 1, the thermal energy capture device 110 is mechanically coupled to and in thermal communication with the anisotropic thermal energy guiding shell 100. For example, in the embodiment depicted in FIG. 1, the thermal energy capture device 110 is mechanically coupled to the first side 102 a distance away from the component attachment region 104. The anisotropic thermal energy guiding shell 100 is configured to guide the thermal energy 150 received by the anisotropic thermal energy guiding shell 100 to the thermal energy capture device 110, as shown by the arrowed lines depicted in FIG. 1. The thermal energy capture device 110 (such as a heat sink) may be configured to dissipate or harvest the thermal energy that it receives. While the embodiment depicted in FIG. 1 includes the thermal energy capture device 110, it should be understood that other embodiments may not include the thermal energy capture device 110, such as embodiments in which the anisotropic thermal energy guiding shell 100 only guides thermal energy away from the component attachment region 104, but does not guide the thermal energy to a particular location or locations.

Figure 3:
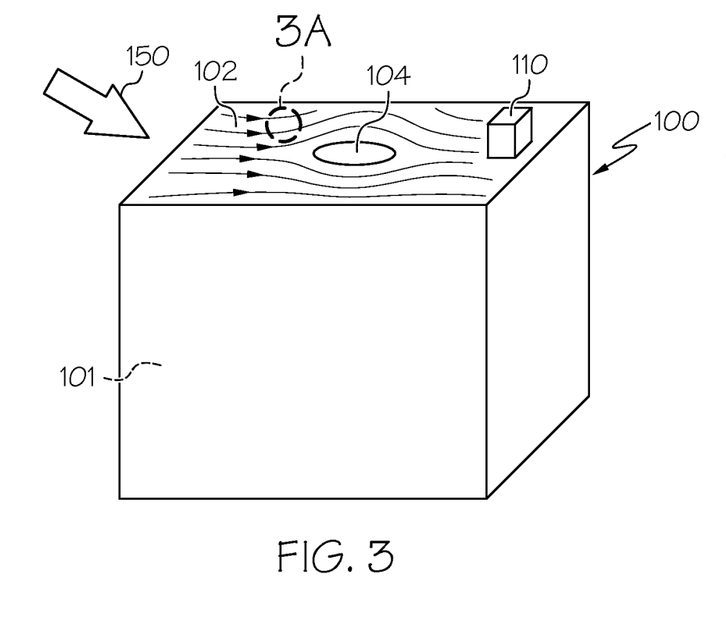
FIGS. 3 and 3A schematically depict the anisotropic thermal energy guiding shell of FIG. 1, further illustrating a plurality of thermally conductive fibers included in a surface of the shell (FIG. 3A), according to one or more embodiments shown and described herein.
Figure 3A:
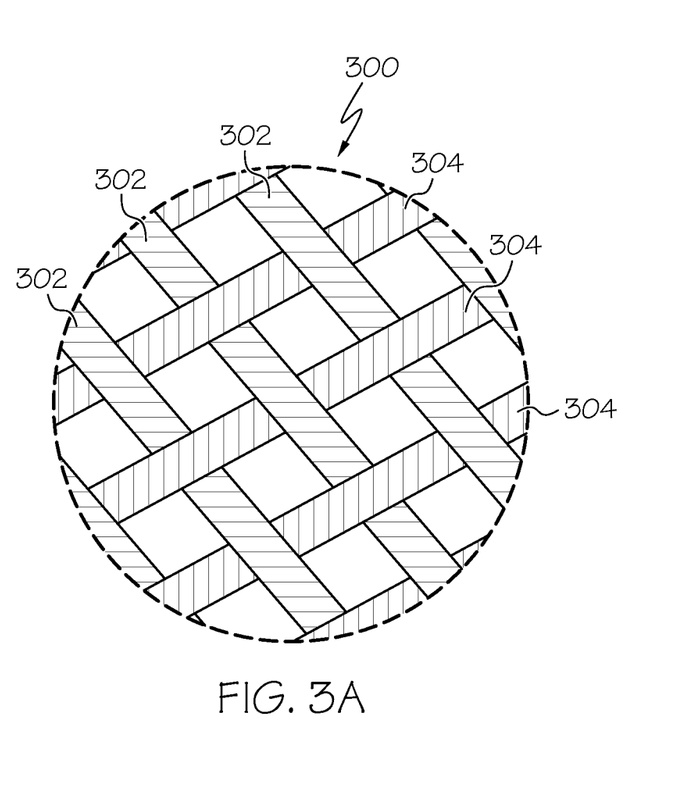

Referring now to FIG. 3, the anisotropic thermal energy guiding shell 100 of FIG. 1 is schematically depicted with a dashed region 3A corresponding to the magnified region of the first side 102 that is depicted in FIG. 3A. Referring now to FIGS. 3 and 3A, the first side 102 includes a plurality of thermally conductive fibers 300 arranged to non-uniformly guide the thermal energy 150 received by the anisotropic thermal energy guiding shell 100 relative to the component attachment region 104 according to a thermal energy management objective (e.g., guiding the thermal energy 150 away from the component attachment region 104 and to the thermal energy capture device 110, as depicted in FIG. 3). In some embodiments, the plurality of thermally conductive fibers 300 may be interwoven in a manner to achieve the thermal energy management objective, such as by employing a custom weave pattern in order to achieve the thermal energy management objective. The plurality of thermally conductive fibers 300 may include copper fibers, stainless steel fibers, glass fibers, Kevlar fibers, carbon fibers, graphite fibers, or any other thermally conductive fiber. In some embodiments, the plurality of thermally conductive fibers 300 are oriented in different directions in order to achieve the non-uniform guiding of the thermal energy 150 relative to the component attachment region 104.

The plurality of thermally conductive fibers 300 depicted in FIG. 3A includes a plurality of a first type of thermally conductive fibers 302 having a lower thermal conductivity, and a plurality of a second type of thermally conductive fibers 304 having a higher thermal conductivity. The higher thermal conductivity of the plurality of the second type of thermally conductive fibers 302 is greater than the lower thermal conductivity of the plurality of the first type of thermally conductive fibers 304. In some embodiments, the plurality of the second type of thermally conductive fibers 302 having the higher thermal conductivity may be stainless steel or copper fibers. In some embodiments, the plurality of the first type of thermally conductive fibers 304 having the lower thermal conductivity may be glass fibers, Kevlar fibers, carbon fibers, or graphite fibers.

While the embodiment depicted in FIGS. 3 and 3A includes two types of thermally conductive fibers, other embodiments may include more than two types of thermally conductive fibers having differing thermal conductivities. Furthermore, some embodiments may not include two different types of thermally conductive fibers, such as embodiments in which the first side 102 includes only one type of thermally conductive fiber. For example, some embodiments may include a plurality of thermally conductive fibers arranged in at least one lower density region of the thermally conductive fibers and at least one higher density region of the thermally conductive fibers. In such embodiments, the at least one lower density region of the thermally conductive fibers and the at least one higher density region of the thermally conductive fibers may be arranged within the anisotropic thermal energy guiding shell in order to non-uniformly guide the thermal energy 150 according to the thermal energy management objective.

Some embodiments may include a plurality of layers, each layer including a plurality of thermally conductive fibers. In such embodiments, the plurality of layers may be stacked to achieve the non-uniform guiding of the thermal energy 150 to accomplish the thermal energy management objective.

While FIGS. 3 and 3A depict the first side 102 as including the plurality of thermally conductive fibers 300, it should be understood that in other embodiments, the first side 102 may not include the plurality of thermally conductive fibers 300, such as embodiments that are configured to non-uniformly guide the thermal energy 150 received by the anisotropic thermal energy guiding shell 100 with other materials, such as one or more regions or layers of higher thermal conductivity materials interposed between one or more regions or layers of lower thermal conductivity materials.

Figure 4:
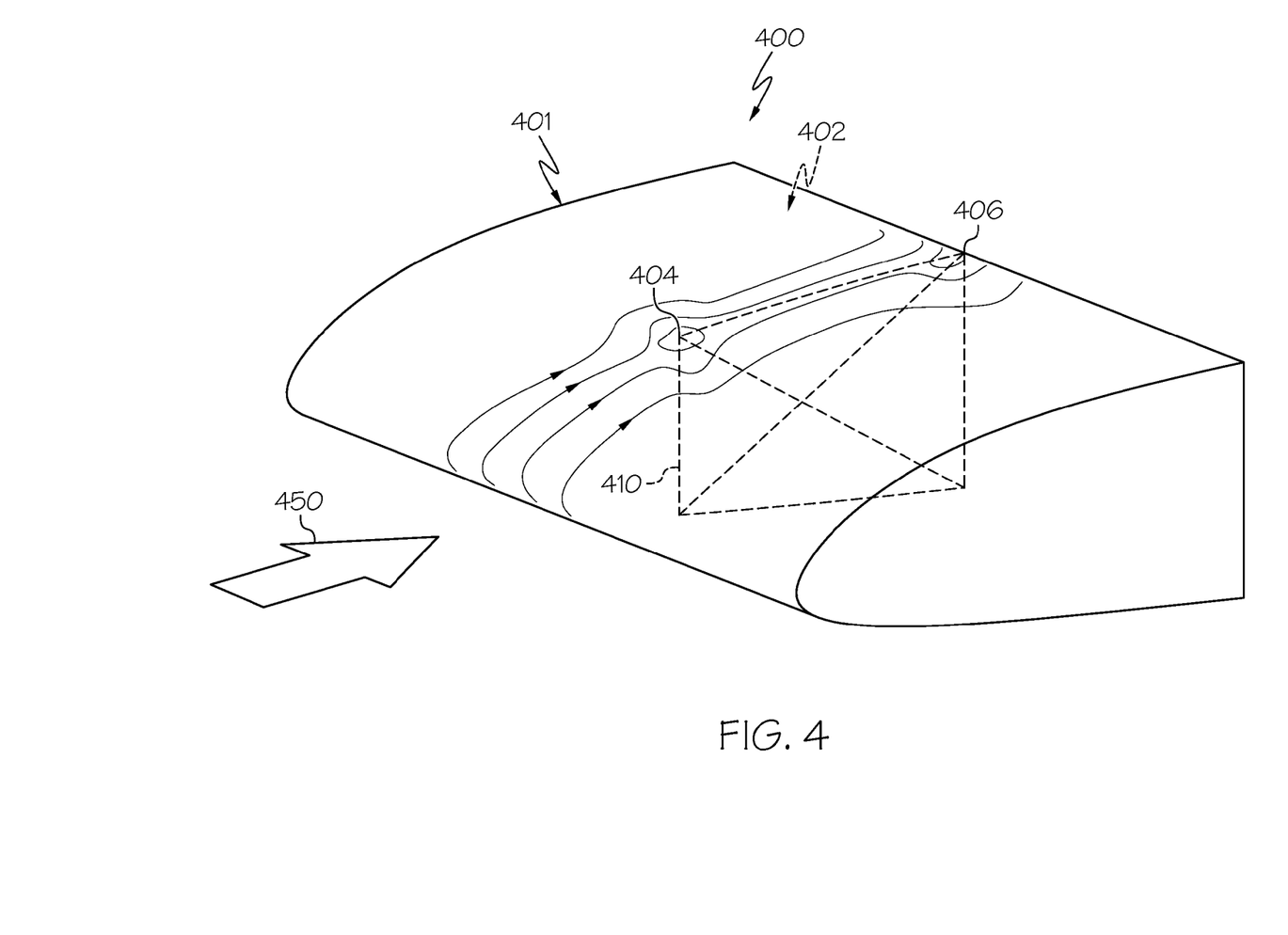
FIG. 4 schematically depicts a thermal energy guiding system including an anisotropic thermal energy guiding shell and an internal support structure disposed in an interior volume of the shell, according to one or more embodiments shown and described herein.

Referring now to FIG. 4, a thermal energy guiding system 400 including an anisotropic thermal energy guiding shell 401 and an internal support structure 410 disposed in an interior volume 402 of the anisotropic thermal energy guiding shell 401 is schematically depicted. The internal support structure 410 is mechanically coupled to the anisotropic thermal energy guiding shell 401 and is in thermal communication with a first component attachment region 404 and a second component attachment region 406. The internal support structure 410 may be a temperature sensitive component, such as a support truss for which structural integrity may diminish if subjected to undesirable thermal energy, for which it may be desirable to guide thermal energy 450 received by the anisotropic thermal energy guiding shell 401 away from the first component attachment region 404 and the second component attachment region 406 to minimize the thermal energy communicated to the internal support structure 410 via the component attachment regions. In some embodiments, the internal support structure 410 is deployable, such that the internal support structure 410 can be inserted into the anisotropic thermal energy guiding shell 401 in a compressed configuration and expanded into a deployed configuration in which the internal support structure 410 is mechanically coupled to and in thermal communication with one or more component attachment points of the anisotropic thermal energy guiding shell 401. In some embodiments, a component other than an internal support structure 410, such as a different temperature sensitive component, may be mechanically coupled to the anisotropic thermal energy guiding shell 401 and in thermal communication with the component attachment regions.

Still referring to FIG. 4, the anisotropic thermal energy guiding shell 401 is configured to non-uniformly guide thermal energy 450 received by the anisotropic thermal energy guiding shell 401 relative to the first component attachment region 404 and the second component attachment region 406 according to a thermal energy management objective, which may include any of the thermal energy management objectives described above, such as guiding thermal energy away from the first component attachment region 404 and the second component attachment region 406, as depicted in FIG. 4. The thermal energy 450 may originate from a radiating thermal energy source or may be transferred to the anisotropic thermal energy guiding shell 401 by convection or conduction. In some embodiments, the thermal energy 450 may be generated by electronic components, internal combustion engines, motors, electromechanical systems, friction of the anisotropic thermal energy guiding shell 401 traveling through the air, or the like. In the embodiment depicted in FIG. 4, the non-uniform guiding of the thermal energy 450 is depicted by the arrowed lines of the surface of the anisotropic thermal energy guiding shell. In some embodiments, the anisotropic thermal energy guiding shell 401 include a plurality of thermally conductive fibers, arranged as described above with respect to FIGS. 3 and 3A. By way of non-limiting example, the anisotropic thermal energy guiding shell 401 may be useful as an exterior component of a spacecraft that guides thermal energy away from component attachment regions to which internal support structures or temperature sensitive components are mechanically coupled and in thermal communication with.

Figure 5:
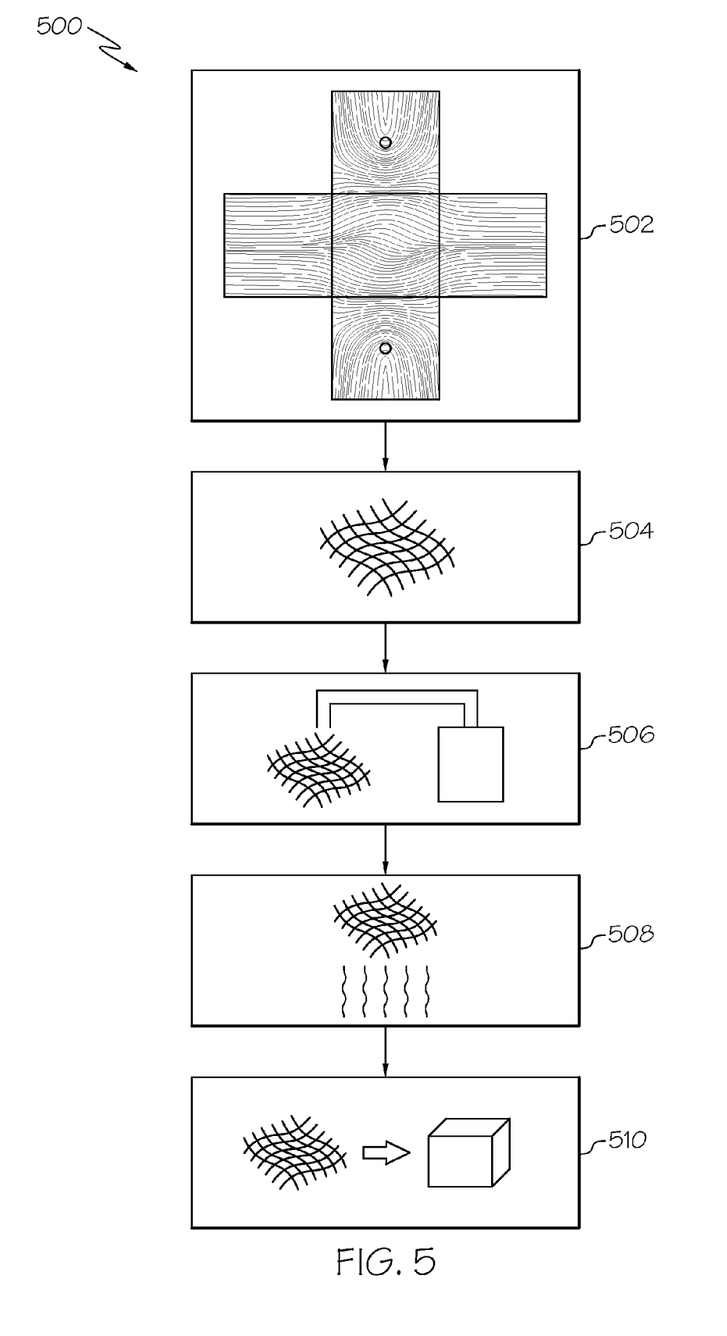
FIG. 5 schematically depicts a flowchart of a method for fabricating a thermal energy guiding shell, according to one or more embodiments shown and described herein.

Referring now to FIG. 5, a method 500 for fabricating a thermal energy guiding shell is depicted. While the method 500 includes a number of steps performed in a particular order, it should be understood that in other embodiments, the steps may not be performed in the order described herein. Furthermore, some embodiments may not include all of the steps of the method 500, such as embodiments in which one or more of the steps are omitted. In some embodiments, one or more of the steps of the method 500 are performed at the same time as one or more of the other steps of the method 500. The method 500 may be used to fabricate any of the anisotropic thermal energy guiding shells described herein. However, it should be understood that the method 500 may also be used for fabricating anisotropic thermal energy guiding shells other than those specifically described herein, and for fabricating isotropic thermal energy guiding shells.

Figure 6:
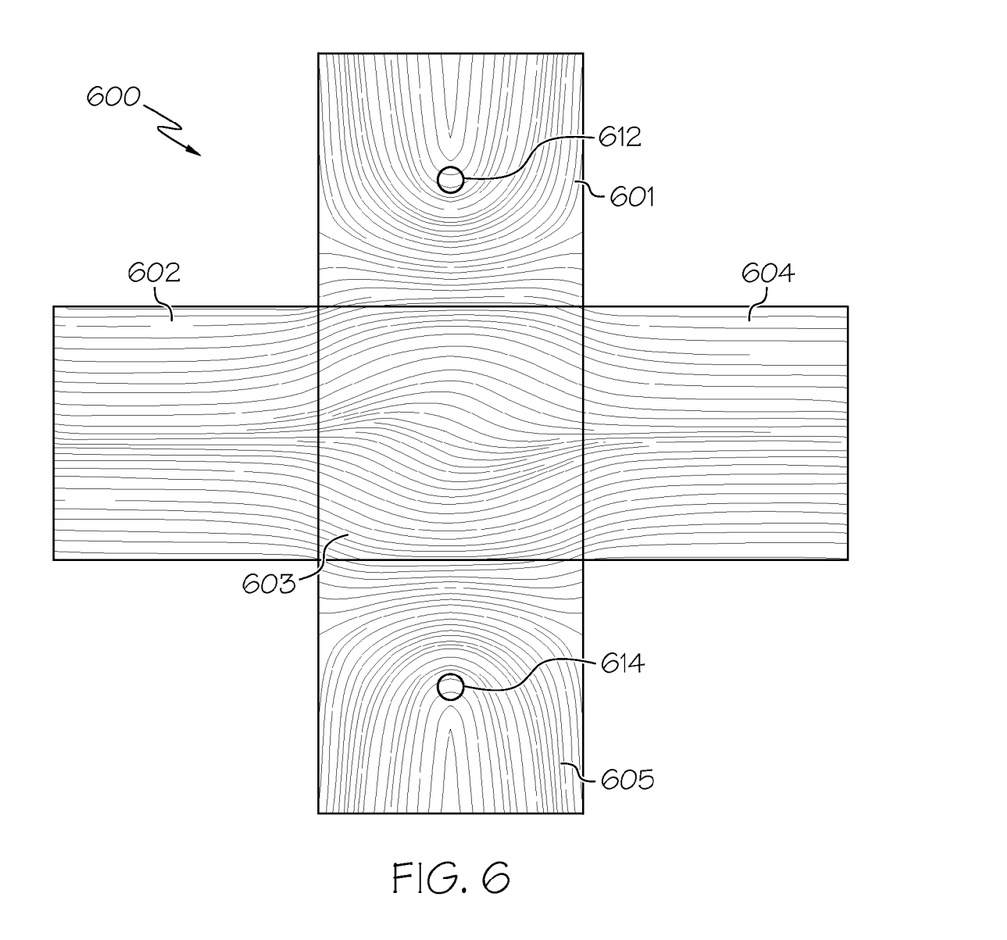
FIG. 6 schematically depicts a thermal energy flow map for guiding thermal energy away from component attachment regions, according to one or more embodiments shown and described herein.
Figure 7:
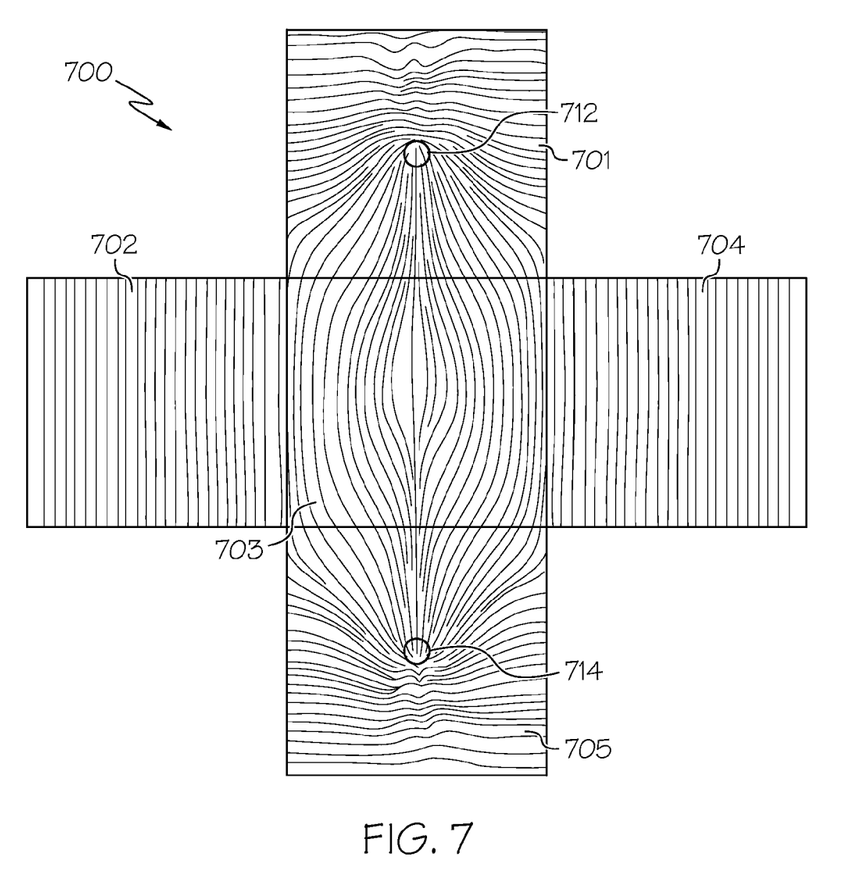
FIG. 7 schematically depicts a thermal energy flow map for guiding thermal energy to component attachment regions, according to one or more embodiments shown and described herein.

Still referring to FIG. 5, at block 502, a thermal energy flow map is generated to achieve a thermal energy management objective, such as any of the thermal energy management objectives described in detail above. The thermal energy flow map may be generated with one or more software design programs and/or numerical modeling programs that allow for the design of a shell structure, the selection of one or more regions or points for thermal management, and the specification for one or more thermal management objectives. For example, FIG. 6 schematically depicts such a thermal energy thermal energy flow map 600 designed to guide thermal energy away from a first component attachment region 612 and a second component attachment region 614 when an anisotropic thermal energy guiding shell is formed in a box shape (e.g., the shape depicted in FIG. 1) having a first side 601, a second side 602, a third side 603, a fourth side 604, and a fifth side 605. As another non-limiting example, FIG. 7 schematically depicts a thermal energy thermal energy flow map 700 designed to guide thermal energy to a first component attachment region 712 and a second component attachment region 714 when an anisotropic thermal energy guiding shell is formed in a box shape (e.g., the shape depicted in FIG. 1) having a first side 701, a second side 702, a third side 703, a fourth side 704, and a fifth side 705. Some embodiments may not include block 502, such as embodiments in which a composite fabric of thermally conductive fibers is formed without first generating a thermal energy flow map.

Still referring to FIG. 5, at block 504, a composite fabric of thermally conductive fibers is formed. In some embodiments, the composite fabric of thermally conductive fibers is formed by arranging a plurality of thermally conductive fibers to non-uniformly guide thermal energy on a surface of the composite fabric of thermally conductive fibers to achieve a thermal energy management objective when the composite fabric of thermally conductive fibers is formed into the thermal energy guiding shield. In some embodiments, the thermally conductive fibers of the composite fabric includes copper fibers, stainless steel fibers, glass fibers, Kevlar fibers, carbon fibers, graphite fibers, or any other thermally conductive fiber. In some embodiments, the plurality of thermally conductive fibers of the composite fabric are oriented in different directions in order to achieve the non-uniform guiding of the thermal energy.

In some embodiments, the composite fabric of thermally conductive fibers is formed by interweaving a plurality of a first type of thermally conductive fibers having a lower thermal conductivity with a plurality of a second type of thermally conductive fibers having a higher conductivity to non-uniformly guide thermal energy on a surface of the composite fabric to achieve a thermal energy management objective when the composite fabric of thermally conductive fibers is formed into a thermal energy guiding shield. In some embodiments, the first type of thermally conductive fibers has a lower thermal conductivity and the second type of thermally conductive fibers have a higher thermal conductivity. The higher thermal conductivity of the second type of thermally conductive fibers is greater than the lower thermal conductivity of the first type of thermally conductive fibers. In some embodiments, the second type of thermally conductive fibers having the higher thermal conductivity may be stainless steel or copper fibers. In some embodiments, the first type of thermally conductive fibers having the lower thermal conductivity may be glass fibers, Kevlar fibers, carbon fibers, or graphite fibers. Some embodiments may not include two different types of thermally conductive fibers, such as embodiments in which the composite fabric includes only one type of thermally conductive fiber.

In embodiments in which a thermal energy flow map is generated (as described above with respect to block 502), the composite fabric of thermally conductive fibers is formed based on the generated thermal energy flow map to achieve the thermal energy management objective. For example, a computer may automatically generate a layout of a plurality of thermally conductive fibers based on the generated thermal energy flow map and the composite fabric of thermally conductive fibers may be formed so that the thermally conductive fibers are arranged according to the generated layout.

Figure 8:
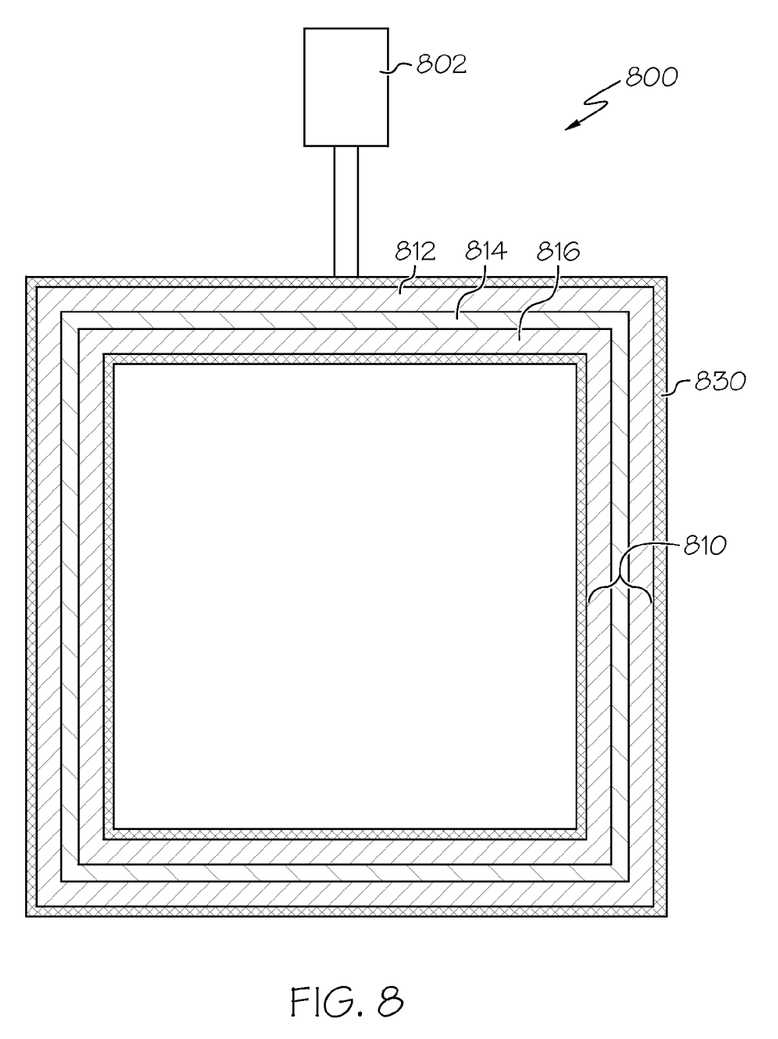
FIG. 8 schematically depicts an apparatus for fabricating a thermal energy guiding shell, according to one more embodiments shown and described herein.

In some embodiments, the composite fabric may include a plurality of stacked layers, each layer including a plurality of thermally conductive fibers. For example, referring now to FIG. 8 (which depicts an apparatus 800 for fabricating a thermal energy guiding shell), a composite fabric 810 includes a first layer of thermally conductive fibers 812 and a second layer or thermally conductive fibers 816. The method may also include providing a core 814 (e.g., a balsa core, a polyvinyl chloride ("pvc") foam core, an aluminum honeycomb core, a phenolic resin honeycomb core, etc.) and disposing one or more layer of thermally conductive fibers on the core 814 to provide added structural rigidity to the molded shape. As shown in FIG. 8, the first layer of thermally conductive fibers 812 is disposed on a first side of the core 814 and the second layer of thermally conductive fibers 816 is disposed on a second side of the core 814. It should be understood that other embodiments may not include the core 814, such as embodiments in which the composite fabric includes one or more layers of thermally conductive fibers, but does not include the core 814.

Referring once again to FIG. 5, at block 506, the composite fabric of thermally conductive fibers formed at block 504 is impregnated with a resin. Referring once again to FIG. 8, resin may be introduced by a resin supply apparatus 802. In some embodiments, the composite fabric 810 is enclosed within an enclosure (such as the mold 830 of FIG. 8 into which the composite fabric 810 is inserted) and resin is pumped into the enclosure by the resin supply apparatus 802 to impregnate the composite fabric 810. In other embodiments, the composite fabric 810 is impregnated with the resin by directly applying the resin to the composite fabric 810 without enclosing the composite fabric 810. In some embodiments, the resin is a thermosetting resin or a thermoplastic resin that is cured when heated. In some embodiments, the composite fabric may be enclosed within a vacuum enclosure and air may be removed from the vacuum enclosure either before the composite fabric is impregnated with resin or while the composite fabric is impregnated with resin to aid with formation of the composite fabric.

Referring once again to FIG. 5, at block 508, the impregnated composite fabric of block 506 is cured. In some embodiments, the composite fabric is cured by applying heat, pressure, or both heat and pressure for a period of time sufficient for the resin to cure. In some embodiments, the composite fabric is disposed within a mold (such as the mold 830 of FIG. 8) during curing. In other embodiments, the composite fabric is not disposed within a mold during curing.

Still referring to FIG. 5, at block 510, the impregnated composite fabric is formed into the thermal energy guiding shell. In some embodiments, forming the impregnated composite fabric into the thermal energy guiding shell includes folding, deploying, or molding the impregnated composite fabric into a deployed shape. In some embodiments, the impregnated composite fabric is formed into the thermal energy guiding shell by inserting the composite fabric into a mold (such as the mold 830 of FIG. 8) and curing the composite fabric.

Figure 9A:
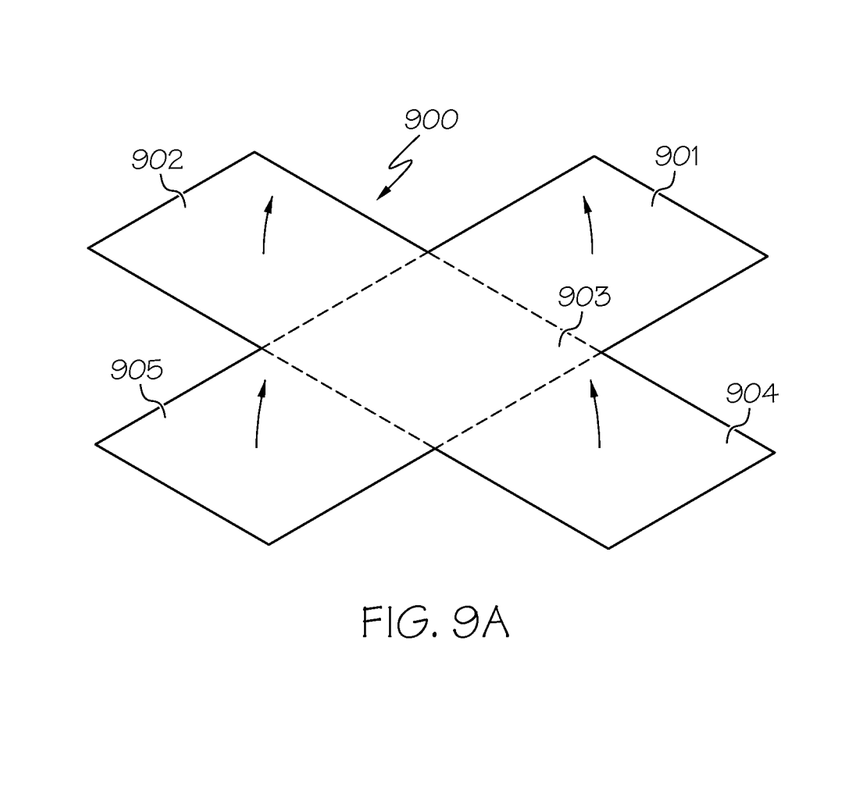
FIGS. 9A and 9B schematically depict a planar thermal energy guiding substrate (FIG. 9A) formed into a thermal energy guiding shell (FIG. 9B), according to one or more embodiments shown and described herein.
Figure 9B:
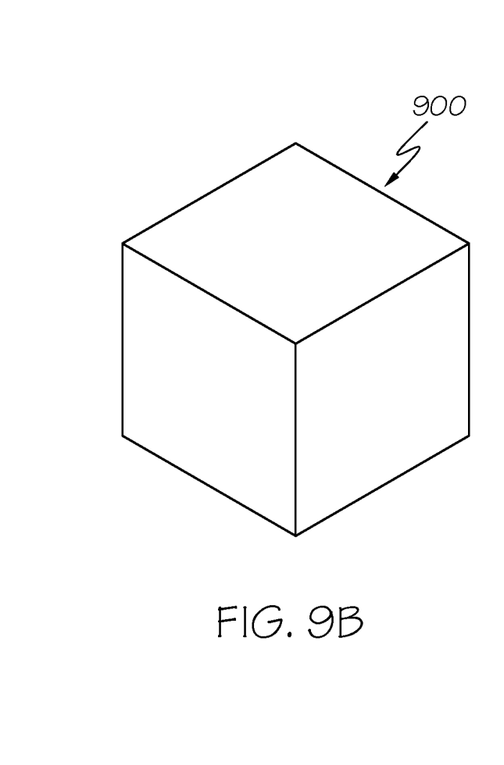

In another embodiment, a thermal energy guiding shell may be fabricated by a method that includes forming a planar thermal energy guiding substrate to achieve a thermal energy management objective, and forming the thermal energy guiding shell including an interior volume from the planar thermal energy guiding substrate. In some embodiments, the planar thermal energy guiding substrate may be formed as a composite fabric including a plurality of thermally conductive fibers as described herein. For example, some embodiments may include forming a composite fabric of thermally conductive fibers, and impregnating the composite fabric with a resin (as described in detail above), such that the planar thermal energy guiding substrate includes the impregnated composite fabric of thermally conductive fibers. FIGS. 9A and 9B schematically depict a planar thermal energy guiding substrate 900 (FIG. 9A) formed into a thermal energy guiding shell by folding up the sides of the planar thermal energy guiding substrate into the box-shaped shell, as depicted in FIG. 9B.

In some embodiments described herein, such as embodiments in which the thermal energy guiding shells are formed from an elastic or flexible composite fabric, the thermal energy guiding shells may be deployed or stretched over one or more components and attached to the one or more components at designed component attachment points.

It should now be understood that the anisotropic thermal energy guiding shells described herein may provide for enhanced management of thermal energy flow to or from one or more locations on a surface of the shell. By orienting the plurality of thermally conductive fibers of the thermal energy guiding shell to achieve anisotropic thermal conductivity in preferred directions, thermal energy can be guided to or re-routed around specific regions or points on the surface. In such a way, the temperature profile of a three dimensional surface forming an enclosure for mounting sensitive components may be controlled. Furthermore, the methods for fabricating thermal energy guiding shells described herein may allow for thermal energy guiding shells to be quickly and easily fabricated in order to achieve a number of potentially complicated thermal management objectives.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An anisotropic thermal energy guiding shell comprising:
   an interior empty volume defined within the anisotropic thermal energy guiding shell;
   a plurality of thermally conductive fibers; and
   at least one component attachment region, wherein the plurality of thermally conductive fibers are arranged to guide thermal energy received by the anisotropic thermal energy guiding shell non-uniformly relative to the at least one component attachment region according to a thermal energy management objective.

2. The anisotropic thermal energy guiding shell of claim 1, wherein the thermal energy management objective includes guiding the thermal energy received by the anisotropic thermal energy guiding shell away from the at least one component attachment region or minimizing an amount of the thermal energy at the at least one component attachment region.

3. The anisotropic thermal energy guiding shell of claim 1, further comprising:
   a thermal energy capture device mechanically coupled to and in thermal communication with the anisotropic thermal energy guiding shell, wherein the thermal energy management objective includes guiding the thermal energy received by the anisotropic thermal energy guiding shell to the thermal energy capture device.

4. The anisotropic thermal energy guiding shell of claim 1, wherein the plurality of thermally conductive fibers are interwoven to achieve the thermal energy management objective.

5. The anisotropic thermal energy guiding shell of claim 1, wherein the plurality of thermally conductive fibers includes:
   a plurality of a first type of thermally conductive fibers having a lower thermal conductivity; and
   a plurality of a second type of thermally conductive fibers having a higher thermal conductivity, wherein the higher thermal conductivity is greater than the lower thermal conductivity.

6. The anisotropic thermal energy guiding shell of claim 1, wherein the plurality of thermally conductive fibers are oriented in different directions in order to achieve the non-uniform thermal energy guiding.

7. The anisotropic thermal energy guiding shell of claim 1, wherein the plurality of thermally conductive fibers includes at least one lower density region of the plurality of thermally conductive fibers and at least one higher density region of the plurality of thermally conductive fibers, wherein the lower density region and the higher density region are arranged within the anisotropic thermal energy guiding shell in order to achieve the non-uniform thermal energy guiding.

8. The anisotropic thermal energy guiding shell of claim 1, wherein the anisotropic thermal energy guiding shell is box shaped.

9. A thermal energy guiding assembly comprising:
   an anisotropic thermal energy guiding shell comprising:
      an interior volume defined within the anisotropic thermal energy guiding shell;
      a plurality of thermally conductive fibers; and
      at least one component attachment region, wherein the plurality of thermally conductive fibers are arranged to guide thermal energy received by the anisotropic thermal energy guiding shell non-uniformly relative to the at least one component attachment region according to a thermal energy management objective; and
   a component within the interior volume of the anisotropic thermal energy guiding shell and coupled to the anisotropic thermal energy guiding shell, wherein the component is in thermal communication with the at least one component attachment region, wherein the thermal energy management objective includes guiding thermal energy away from the component.

10. The thermal energy guiding assembly of claim 9, wherein the thermal energy management objective includes guiding the thermal energy received by the anisotropic thermal energy guiding shell away from the at least one component attachment region or minimizing an amount of the thermal energy at the at least one component attachment region.

11. The thermal energy guiding assembly of claim 9, wherein the anisotropic thermal energy guiding assembly further comprises:
   a thermal energy capture device mechanically coupled to and in thermal communication with the anisotropic thermal energy guiding shell, wherein the thermal energy management objective includes guiding the thermal energy received by the anisotropic thermal energy guiding shell to the thermal energy capture device.

12. The thermal energy guiding assembly of claim 9, wherein the plurality of thermally conductive fibers are interwoven to achieve the thermal energy management objective.

13. The thermal energy guiding assembly of claim 9, wherein the plurality of thermally conductive fibers includes:
   a plurality of a first type of thermally conductive fibers having a lower thermal conductivity; and
   a plurality of a second type of thermally conductive fibers having a higher thermal conductivity, wherein the higher thermal conductivity is greater than the lower thermal conductivity.

14. The thermal energy guiding assembly of claim 9, wherein the plurality of thermally conductive fibers are oriented in different directions in order to achieve the non-uniform thermal energy guiding.

15. The thermal energy guiding assembly of claim 9, wherein the plurality of thermally conductive fibers includes at least one lower density region of the plurality of thermally conductive fibers and at least one higher density region of the plurality of thermally conductive fibers, wherein the lower density region and the higher density region are arranged within the anisotropic thermal energy guiding shell in order to achieve the non-uniform thermal energy guiding.

16. The thermal energy guiding assembly of claim 9, wherein the component is a printed circuit board.

17. The thermal energy guiding assembly of claim 9, wherein the component is an internal support structure.

18. The thermal energy guiding assembly of claim 9, wherein the anisotropic thermal energy guiding shell is box shaped.

* * * * *